United States Patent
Rudagi et al.

(10) Patent No.: US 10,994,609 B2
(45) Date of Patent: May 4, 2021

(54) ACTUATION SYSTEM HAVING FACE CAM MECHANISM OPERATED BY A PLANETARY GEAR SET

(71) Applicant: BorgWarner Inc., Auburn Hills, MI (US)

(72) Inventors: Mallikarjun Rudagi, Troy, MI (US); Abhinav Jain, Rochester, MI (US); Sathya Vaidyanathan, Troy, MI (US)

(73) Assignee: BorgWarner Inc., Auburn Hills, MI (US)

( * ) Notice: Subject to any disclaimer, the term of this patent is extended or adjusted under 35 U.S.C. 154(b) by 360 days.

(21) Appl. No.: 15/960,731

(22) Filed: Apr. 24, 2018

(65) Prior Publication Data

US 2018/0312062 A1 Nov. 1, 2018

Related U.S. Application Data

(66) Substitute for application No. 62/490,899, filed on Apr. 27, 2017.

(51) Int. Cl.
*B60K 23/08* (2006.01)
*F16H 25/12* (2006.01)
(Continued)

(52) U.S. Cl.
CPC ........ *B60K 23/0808* (2013.01); *B60K 17/344* (2013.01); *F16D 23/12* (2013.01); *F16H 1/46* (2013.01); *F16H 25/12* (2013.01); *F16H 25/125* (2013.01); *B60K 2023/085* (2013.01);
*B60K 2023/0875* (2013.01); *F16D 13/52* (2013.01); *F16D 2023/123* (2013.01)

(58) Field of Classification Search
CPC .......... B60K 23/0808; B60K 2023/085; B60K 2023/0875; B60K 2023/0858; B60K 17/344; F16H 2057/02052
See application file for complete search history.

(56) References Cited

U.S. PATENT DOCUMENTS 5,993,454 A * 11/1999 Longo ................ A61B 17/1624
606/80
8,428,838 B2 * 4/2013 Kondo ................... B60K 23/08
701/69

(Continued)

*Primary Examiner* — Richard W Ridley
*Assistant Examiner* — Brian J McGovern
(74) *Attorney, Agent, or Firm* — Young Basile Hanlon & MacFarlane, P.C.

(57) ABSTRACT

An actuation system of a transfer case includes a face cam, a motor, a gear reduction assembly, and an intermediate rotating member. The face cam includes a first member and a second member, and rotation of the first member relative to the second annular causes the first member or the second annular member to displace axially relative to the other member for selective operation of a torque transfer mechanism of the torque transfer device. The gear reduction assembly includes a first planetary gear set that increases torque from the motor by a first ratio, and a second planetary gear set that increases torque from the first planetary gear set by a second ratio and is coaxial with the first planetary gear set and the motor. The intermediate rotating member is rotated by the gear reduction assembly and rotates the first annular member for selective operation of the torque transfer mechanism.

20 Claims, 9 Drawing Sheets

(51) Int. Cl.
  *B60K 17/344* (2006.01)
  *F16H 1/46* (2006.01)
  *F16D 23/12* (2006.01)
  *F16D 13/52* (2006.01)

(56) References Cited

U.S. PATENT DOCUMENTS

| | | | |
|---|---|---|---|
| 2004/0163916 A1* | 8/2004 | Showalter | B60K 17/3467 192/48.2 |
| 2009/0211830 A1* | 8/2009 | Kato | F16D 13/72 180/244 |
| 2009/0229905 A1* | 9/2009 | Kato | F16D 13/72 180/249 |
| 2010/0227724 A1* | 9/2010 | Quinn | F16H 1/46 475/11 |
| 2013/0269305 A1* | 10/2013 | Wang | A01D 34/78 56/14.7 |
| 2014/0033842 A1* | 2/2014 | Morin | F16H 37/041 74/89.17 |
| 2015/0158383 A1* | 6/2015 | Mastie | B60K 17/3467 475/204 |
| 2015/0159751 A1* | 6/2015 | Pritchard | B60K 17/3467 475/150 |
| 2016/0017957 A1* | 1/2016 | Graybar | H02K 11/215 475/149 |

\* cited by examiner

ACTUATION SYSTEM HAVING FACE CAM MECHANISM OPERATED BY A PLANETARY GEAR SET

CROSS-REFERENCE TO RELATED APPLICATION(S)

This application claims the benefit of, and priority to, U.S. Provisional Patent Application Ser. No. 62/490,899, filed on Apr. 27, 2017, the entire content of which is hereby incorporated by reference.

TECHNICAL FIELD

This disclosure relates to actuation systems and, in particular, actuation systems having face cam mechanisms and transfer cases comprising the same.

BACKGROUND

Transfer cases and other torque transfer devices in vehicle powertrain systems utilize actuation systems to selectively transfer torque between various inputs and outputs. For example, a transfer case may receive input torque from an output of a transmission and provide output torque to a primary output shaft and selectively to a secondary output shaft. Such actuation systems may add volume and/or mass to the transfer case and may protrude from the transfer case. It would be advantageous to provide actuation systems with components that allow for different size and shapes of transfer cases, which may be advantageous in different vehicle applications, for example, with different packaging or ground clearance requirements.

SUMMARY

Disclosed herein are implementations of an actuation system of a transfer case that includes a face cam, a motor, a gear reduction assembly, and an intermediate rotating member. The face cam includes a first member and a second member, and rotation of the first member relative to the second annular member causes the first member or the second annular member to displace axially relative to the other member for selective operation of a torque transfer mechanism of the torque transfer device. The gear reduction assembly includes a first planetary gear set that increases torque from the motor by a first ratio, and a second planetary gear set that increases torque from the first planetary gear set by a second ratio and is coaxial with the first planetary gear set and the motor. The intermediate rotating member is rotated by the gear reduction assembly and rotates the first annular member for selective operation of the torque transfer mechanism.

In one aspect of the present disclosure, an actuation system is disclosed for use with a torque transfer device of a vehicle powertrain. The actuation system includes a face cam mechanism, an actuator motor in mechanical cooperation with the face cam mechanism, a gear reduction assembly, and at least one intermediate member.

The face cam mechanism includes first and second annular members, wherein relative rotation between the first and second annular members causes axial displacement of one of the first and second annular members to activate a torque transfer mechanism of the torque transfer device.

The gear reduction assembly is in mechanical cooperation with the actuator motor and includes first and second planetary gear sets. The first planetary gear set receives and increases torque from the actuator motor by a first ratio to provide a first output torque, and is positioned in coaxial relation with the actuator motor. The second planetary gear set receives and increases the first output torque by a second ratio to provide a second output torque, and is positioned in coaxial relation with the first planetary gear set and the actuator motor.

The at least one intermediate member is rotated by the gear reduction assembly (e.g., being configured, dimensioned, and positioned for rotation thereby) to cause relative rotation between the first and second annular members to thereby activate the torque transfer mechanism.

In certain embodiments, the first planetary gear set may include a plurality of first planet gears that receive torque from the actuator motor, a first planet carrier in mechanical cooperation (e.g., in mechanical engagement) with the second planetary gear set, and a first ring gear that circumscribes the first planet gears.

In certain embodiments, the second planetary gear set may include a plurality of second planet gears in mechanical cooperation (e.g., in mechanical engagement) with the first planet carrier, a second planet carrier in mechanical cooperation (e.g., in mechanical engagement) with the at least one intermediate member, and a second ring gear that circumscribes the second planet gears.

In certain embodiments, the at least one intermediate member may include a barrel cam positioned in coaxial relation with the face cam mechanism.

In certain embodiments, the at least one intermediate member may engage the second planetary gear set to receive and increase the second output torque by a third ratio to provide a third output torque. In such embodiments, the at least one intermediate member may engage at least one of the first or second annular members to cause relative rotation between the first and second annular members.

In certain embodiments, the gear reduction assembly may further include a third planetary gear set that receives and increases the second output torque by a third ratio to provide a third output torque. In such embodiments, the barrel cam may engage the third planetary gear set to receive the third output torque and cause relative rotation between the first and second annular members.

In certain embodiments, the face cam mechanism may include a plurality of rolling members positioned between the first and second annular members.

In certain embodiments, the first and second annular members may include opposed axial faces having ramped surfaces to receive the rolling members therebetween (e.g., being so configured and dimensioned).

In certain embodiments, the barrel cam rotates the first annular member.

In another aspect of the present disclosure, a torque transfer device is disclosed that is configured and dimensioned to transfer torque from a primary output shaft of a vehicle powertrain to a secondary output shaft of the vehicle powertrain. The torque transfer device includes a housing, a torque transfer mechanism positioned within the housing, and an actuation system.

The torque transfer mechanism includes a primary gear, a plate clutch rotatably coupling the primary gear to the primary output shaft of the vehicle powertrain, a secondary gear rotatably fixed to the secondary output shaft of the vehicle powertrain, and one of a chain or a transfer gear that extends between the primary gear and the secondary gear to transfer torque therebetween.

The actuation system includes an actuator motor including an output gear, a ball ramp mechanism in mechanical cooperation with the actuator motor, a gear reduction assembly, and at least one intermediate member.

The ball-ramp mechanism includes first and second annular members, wherein relative rotation between the first and second annular members causes relative axial displacement between the first and second annular members to actuate the torque transfer mechanism.

The gear reduction assembly includes a first planetary gear set that receives and increases torque from the actuator motor by a first ratio to provide a first output torque, and a second planetary gear set that receives and increases the first output torque from the first planetary gear set by a second ratio to provide a second output torque.

The at least one intermediate member is in mechanical engagement with the gear reduction assembly and the face cam mechanism such that rotation of the at least one intermediate member causes relative rotation between the first and second annular members of the face cam mechanism.

In certain embodiments, the first planetary gear set may include a plurality of first planet gears in mechanical engagement with the output gear of the actuator motor, a first planet carrier in mechanical engagement with the second planetary gear set, and a first ring gear that is rotationally fixed to the housing.

In certain embodiments, the second planetary gear set may include a plurality of second planet gears in mechanical engagement with the first planet gears, a second planetary carrier in mechanical engagement with the at least one intermediate member to cause rotation of the at least one intermediate member, and a second ring gear that is rotationally fixed to the housing.

In certain embodiments, the first planetary gear set may be configured and dimensioned such that the first ratio lies within the range of 2:1 to 8:1 and the second planetary gear set may be configured and dimensioned such that the second ratio lies within the range of 2:1 to 8:1. In such embodiments, the first and second planetary gear sets may collectively increase torque from the actuator motor by a ratio within the range of 4:1 to 64:1.

In certain embodiments, the gear reduction assembly may further include a third planetary gear set that receives and increases the second output torque by a third ratio to provide a third output torque.

In certain embodiments, the at least one intermediate member may mechanically engage the third planetary gear set to receive the third output torque and cause relative rotation between the first and second annular members.

In certain embodiments, the ball-ramp mechanism includes a plurality of rolling members positioned between the first and second annular members.

In certain embodiments, the first and second annular members may include opposed axial faces having ramped surfaces to receive the rolling members (e.g., being so configured and dimensioned).

In certain embodiments, the recesses may define a variable depth.

In another aspect of the present disclosure, a torque transfer device is disclosed that is configured and dimensioned to transfer torque from a primary output shaft of a vehicle powertrain to a secondary output shaft of the vehicle powertrain. The torque transfer device includes a torque transfer mechanism and an actuation system that is engageable with the torque transfer mechanism, wherein the actuation system includes an actuator motor, a face cam mechanism in mechanical cooperation with the actuation motor, a gear reduction assembly, and at least one intermediate member.

The face cam mechanism includes first and second annular members that are configured and dimensioned for relative rotation to cause relative axial displacement between the first and second annular members and rotation of the torque transfer mechanism.

The gear reduction assembly includes a first planetary gear set that receives and increases torque from the actuator motor by a first ratio to provide a first output torque, a second planetary gear set that receives and increases the first output torque from the first planetary gear set by a second ratio to provide a second output torque, and a third planetary gear set that receives and increases the second output torque by a third ratio to provide a third output torque.

The at least one intermediate member is in mechanical engagement with the gear reduction assembly and the face cam mechanism such that torque transferred (e.g., communicated) to the at least one intermediate member causes relative rotation between the first and second annular members.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
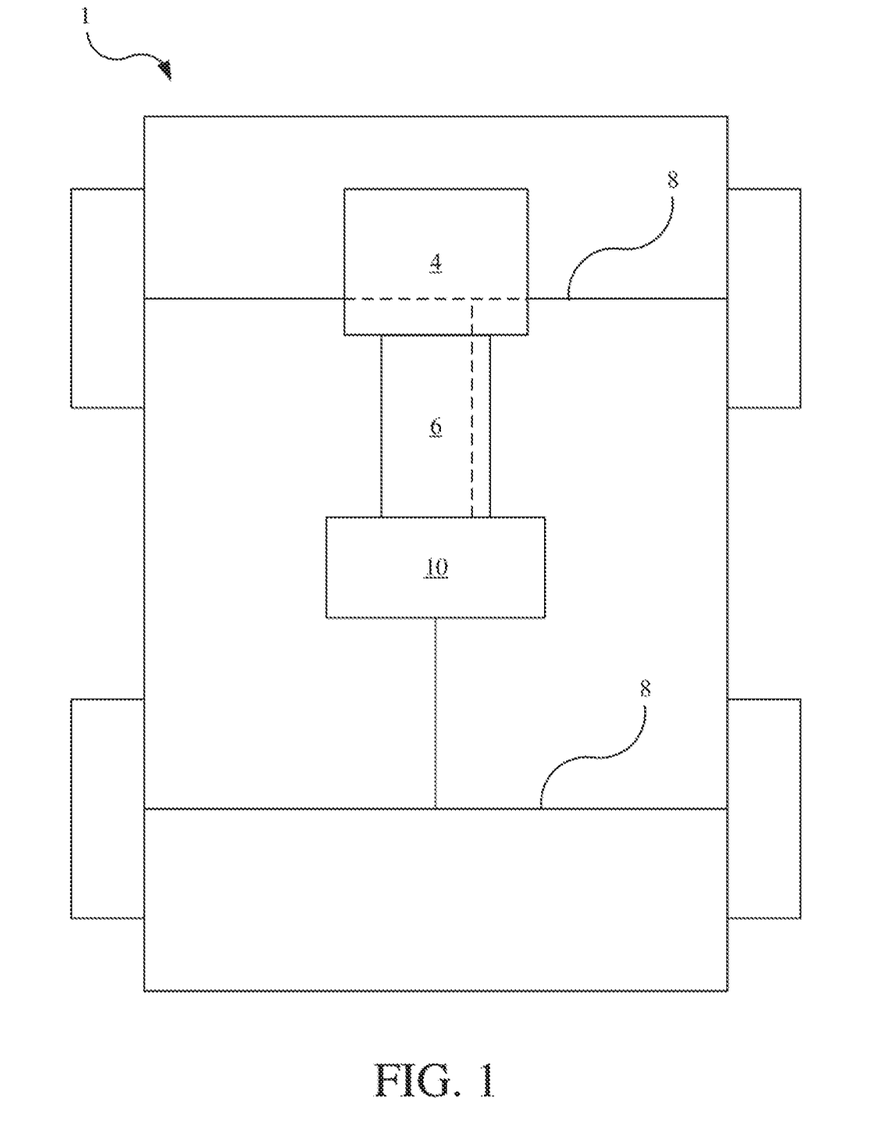
FIG. 1 is a schematic view of a vehicle having a powertrain.

Referring to FIG. 1, a vehicle 1 includes a powertrain 2 having an engine 4 (or other drive source), a transmission 6, axles 8, and a transfer case 10. The engine 4 provides an output torque to the transmission 6, which in turn provides output torque to the transfer case 10. The transfer case 10 transfers torque from the transmission to one of the axles 8 (e.g., a rear axle) and selectively transfers torque to another of the axles 8. It should be noted that the axles 8 may be assemblies that include two half-shafts that each extend to a wheel (not labeled).

Figure 2:
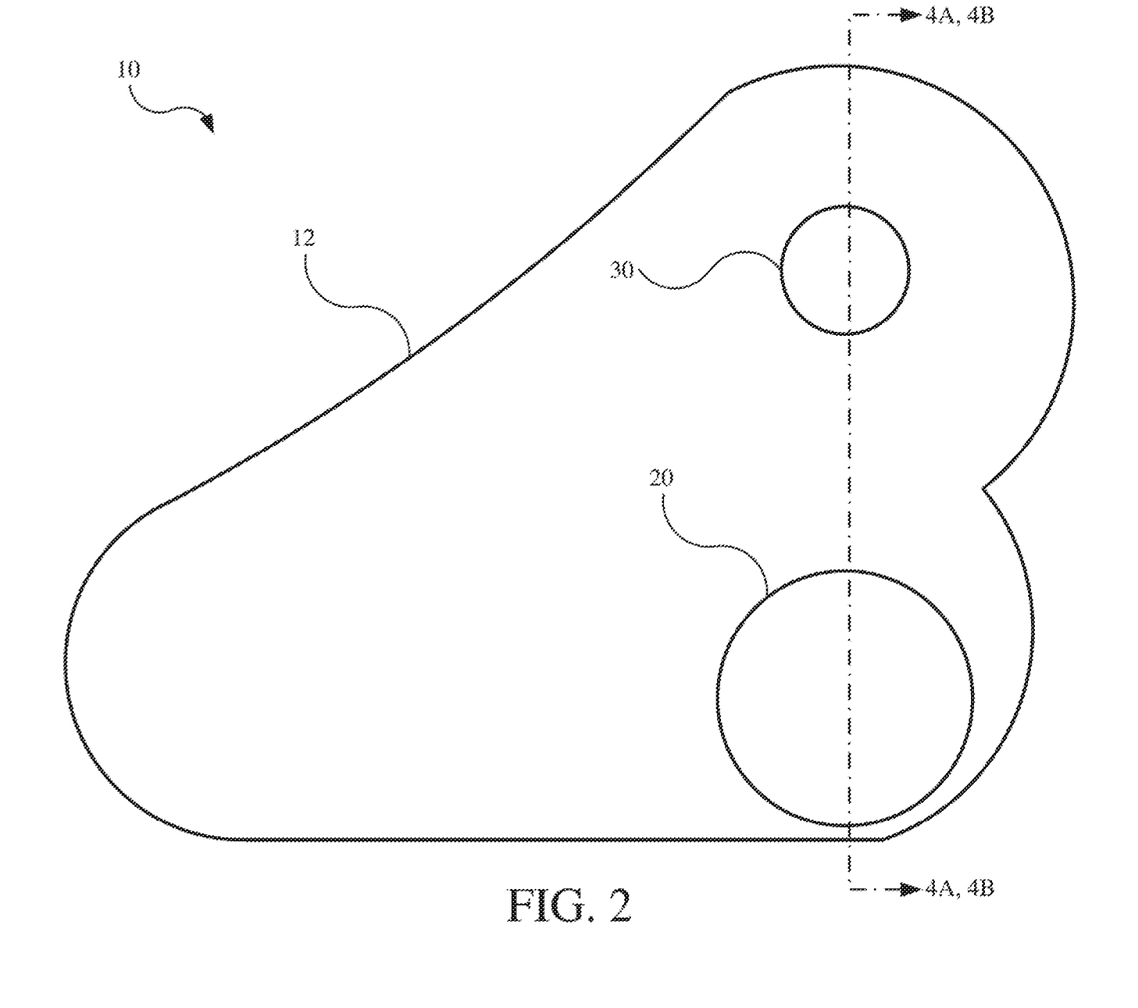
FIG. 2 is a schematic end view of a transfer case of the powertrain of the vehicle shown in FIG. 1.
Figure 3:
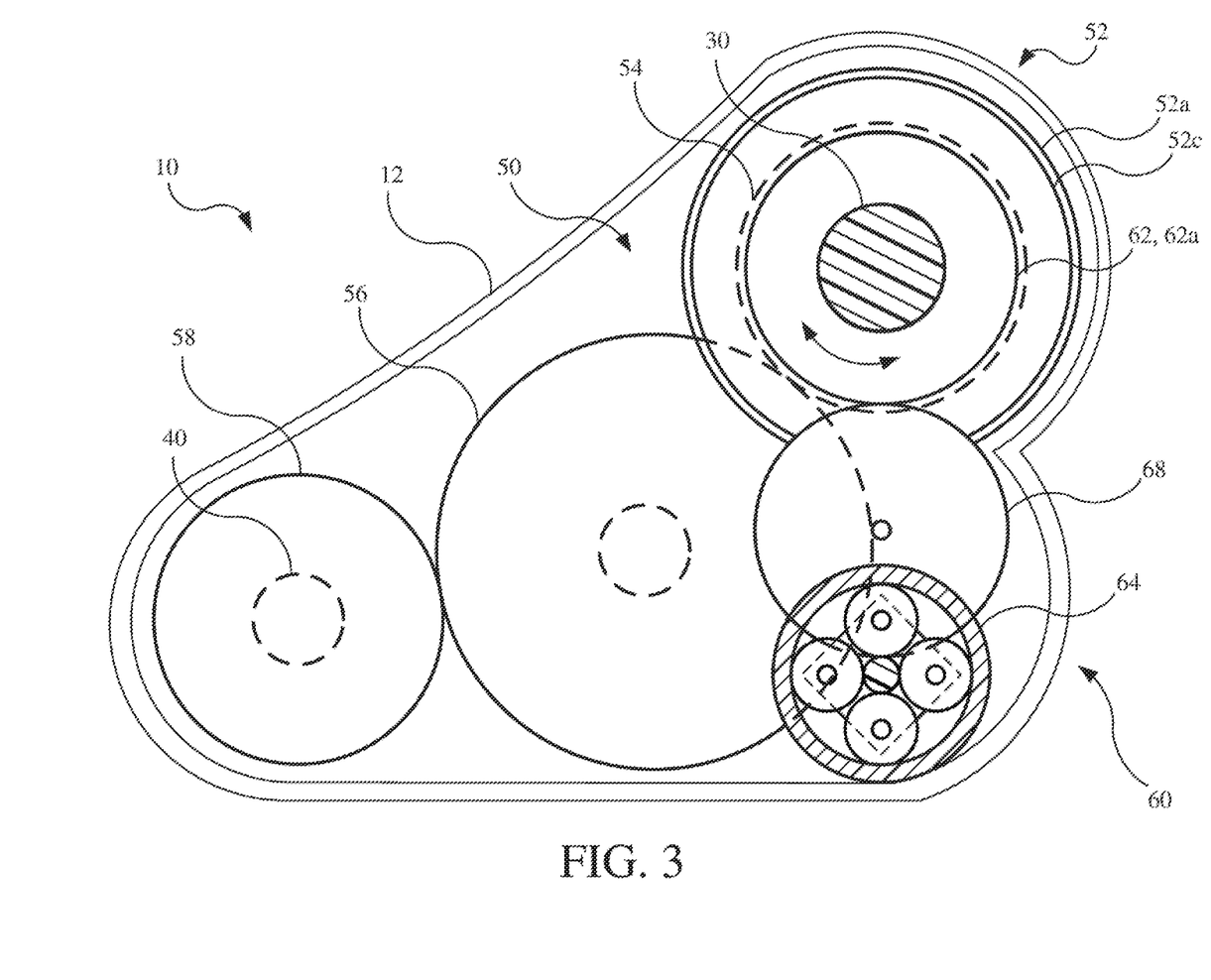
FIG. 3 is a schematic cross-sectional view of the transfer case taken along line 3-3 in FIG. 4A.
Figure 4A:
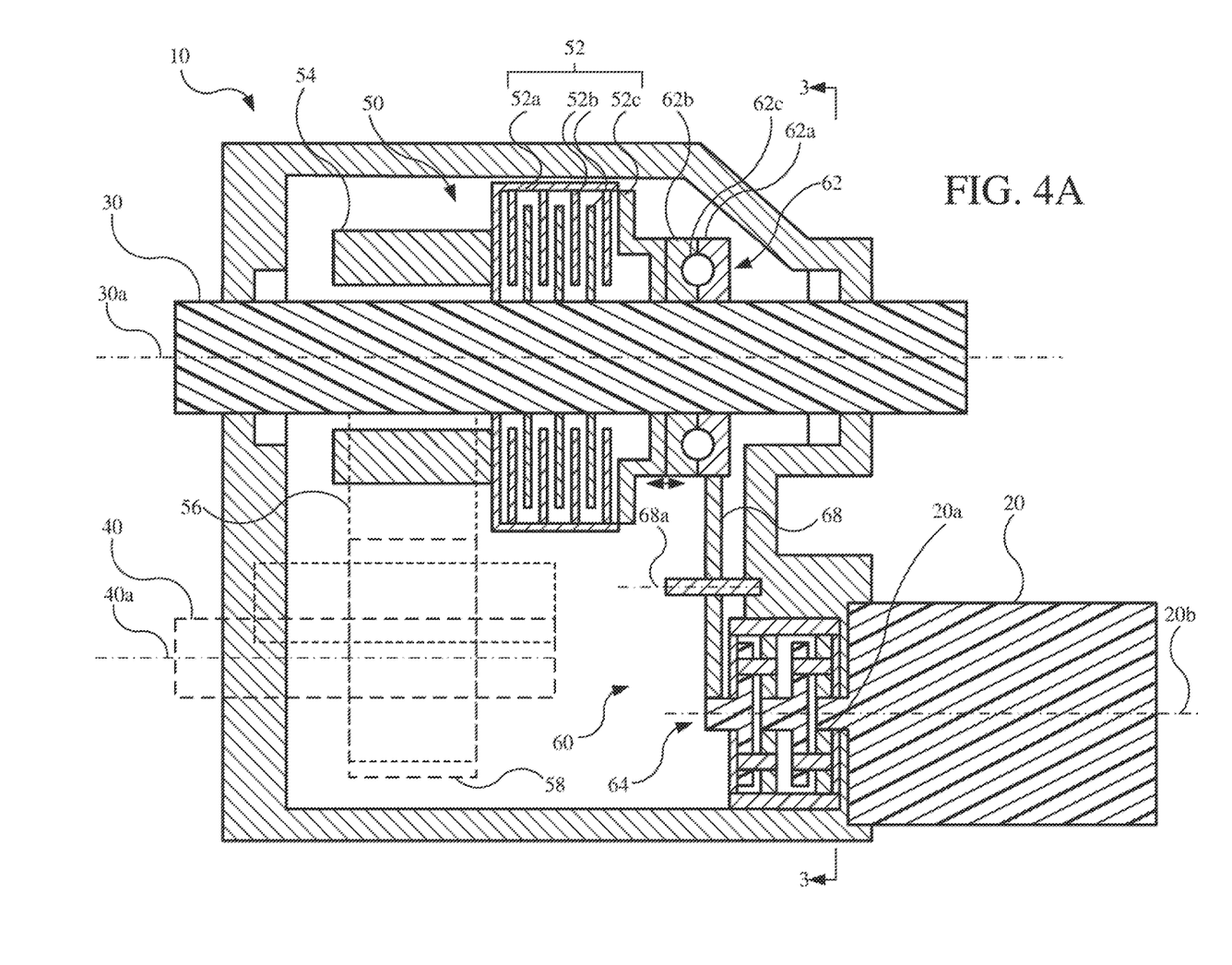
FIG. 4A is a partial schematic cross-sectional view taken along line 4A-4A in FIG. 2 depicting the transfer case in a first state and with a portion of a housing of the transfer case removed.
Figure 4B:
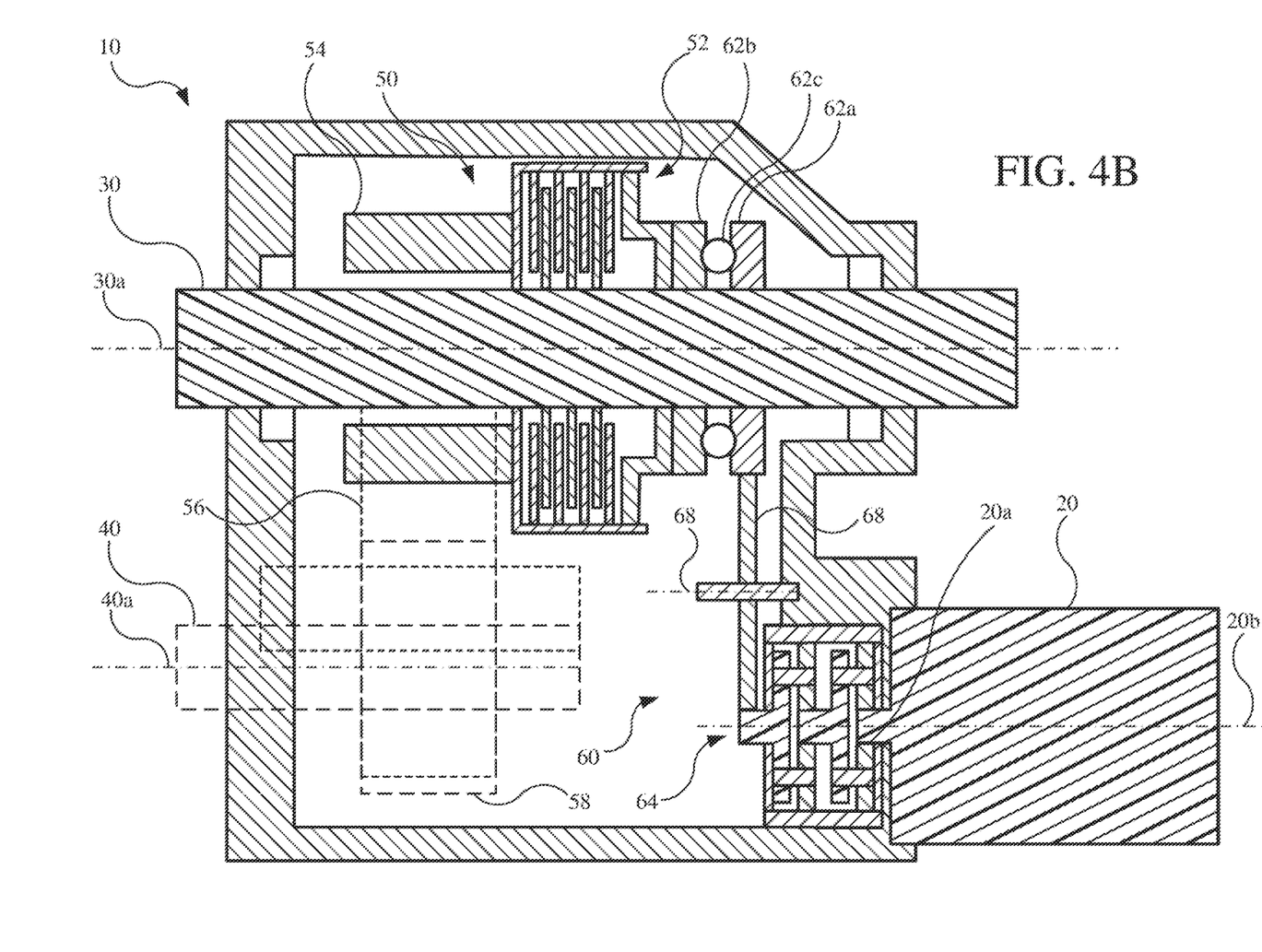
FIG. 4B is a partial schematic cross-sectional view taken along line 4B-4B in FIG. 2 depicting the transfer case in a second state and with a portion of the housing of the transfer case removed.
Figure 5A:
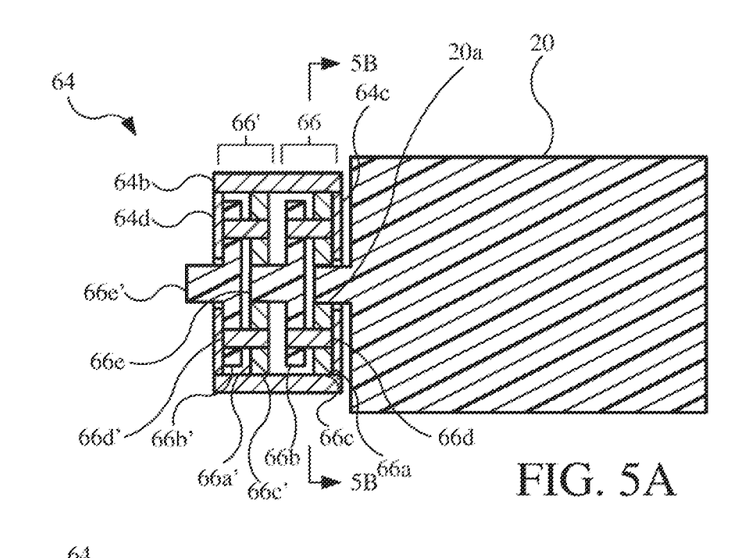
FIG. 5A is a partial schematic cross-sectional view of an actuation system of the transfer case as shown in FIG. 4A.
Figure 5B:
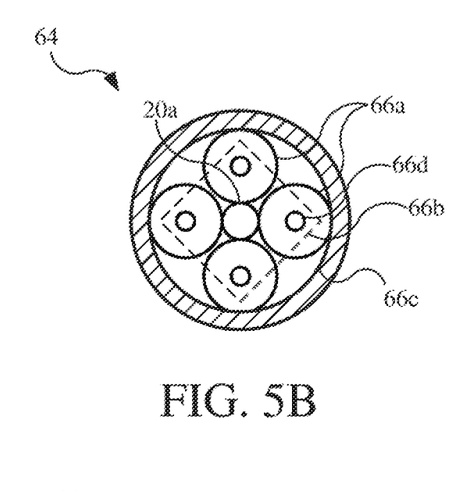
FIG. 5B is a partial schematic cross-sectional view of the actuation system taken along line 5B-5B in FIG. 5A.
Figure 5C:
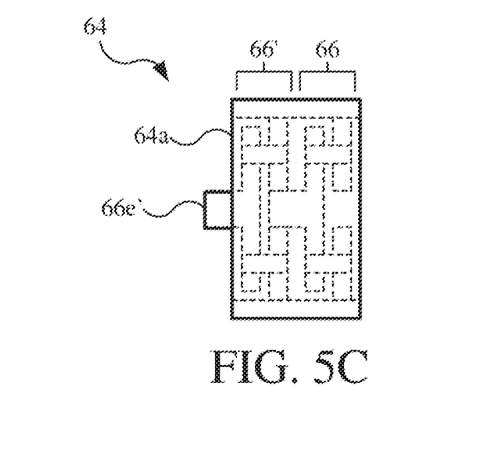
FIG. 5C is a schematic side view of a gear reduction assembly of the actuation system with hidden components depicted in phantom (i.e., dashed lines).
Figure 5D:
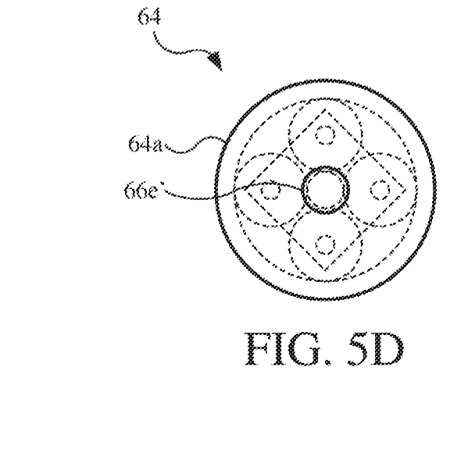
FIG. 5D is a schematic end view of the gear reduction assembly of the actuation system with hidden components depicted in phantom.

Referring to FIGS. 2-4, the transfer case 10 is configured to selectively transfer torque from a primary output shaft 30 (e.g., a rear output shaft) to a secondary output shaft 40 (e.g., a front output shaft). The transfer case 10 generally includes a transfer case housing 12, an actuator motor 20, the primary output shaft 30 that protrudes from the transfer case housing 12 (e.g., from a rearward end of the transfer case housing 12), and the secondary output shaft 40 that protrudes from the transfer case housing 12 (e.g., from a forward end of the transfer case housing 12). The transfer case additionally includes a torque transfer mechanism 50 and an actuation system 60 that selectively operates the torque transfer mechanism 50 to transfer torque between the primary output shaft 30 and the secondary output shaft 40. The torque transfer mechanism 50 and/or the actuation system 60 may be incorporated in other types of torque transfer devices besides the transfer case 10.

The primary output shaft 30 and the secondary output shaft 40 are each supported radially within the transfer case housing 12 by bearings, which are depicted schematically in FIGS. 4A and 4B for the primary output shaft 30 but are not labeled. The primary output shaft 30 has a central axis 30a. The secondary output shaft 40 is parallel with the primary output shaft 30 and has another central axis 40a.

The torque transfer mechanism 50 generally includes a plate clutch 52, a primary gear 54, a transfer gear 56 (e.g., intermediate gear), and a secondary gear 58. The plate clutch 52 selectively rotatably couples the primary gear 54 to the primary output shaft 30 (e.g., with a friction coupling). The secondary gear 58 is rotatably fixed to the secondary output shaft 40 (e.g., being formed therewith, splined therewith, or having an intermediate coupling member). The transfer gear 56 extends between and is engaged with the primary gear 54 and the secondary gear 58, so as to transfer torque therebetween. The transfer gear 56 is supported radially within the transfer case housing 12 by bearings (not shown). In FIG. 3, portions of the primary gear 54 and portions of the transfer gear 56, which are hidden by other components of the transfer case 10, are depicted in dashed lines. In FIGS. 4A-4B, the secondary output shaft 40, the transfer gear 56, and the secondary gear 58 are depicted in dashed lines for axial and vertical reference, but may not be visible in the section view taken from FIG. 2. It should be noted, the primary gear 54, the transfer gear 56, and the secondary gear 58 are depicted schematically but include teeth of suitable geometry for engaging each other and transferring torque therebetween.

The plate clutch 52 generally includes a clutch housing 52a (e.g., drum), interleaved plates 52b that are alternatingly rotatably fixed (e.g., with a sliding splined connection) to the primary output shaft 30 and the clutch housing 52a, and an apply plate 52c (e.g., pressure plate) that may be rotatably fixed to the primary output shaft 30. When the apply plate 52c is moved axially toward the clutch housing 52a by the actuation system 60 (discussed further below), the apply plate 52c is displaced axially to compressed the interleaved plates 52b. Torque may, thereby, be transferred from the primary output shaft 30 to the interleaved plates 52b, from the interleaved plates 52b to the clutch housing 52a, from the clutch housing 52a to the primary gear 54 rotatably fixed thereto, from the primary gear 54 to the transfer gear 56, from the transfer gear 56 to the secondary gear 58, and from the secondary gear 58 to the secondary output shaft 40 rotatably fixed thereto.

The actuation system 60 includes the actuator motor 20, a face cam mechanism 62 (e.g., a ball-ramp mechanism), and a reduction gear assembly 64 (e.g., unit, or mechanism). The face cam mechanism 62 and the reduction gear assembly 64 are located within the transfer case housing 12, while the motor 20 may be substantially exterior to the transfer case housing 12 (e.g., being mounted thereto) with an output thereof (e.g., the output gear 20a thereof) protruding partially into the housing 12. Alternatively, a recess for receiving the output gear 20a may be arranged exterior to the transfer case housing 12, such that no portion of the motor 20 is arranged in the transfer case housing 12.

The face cam mechanism 62 is configured to bias the apply plate 52c, so as to compress the interleaved plate 52b. More particularly, the face cam mechanism 62 converts rotational motion originating from the actuator motor 20 into axial displacement. The face cam mechanism 62 generally includes a first annular member 62a (e.g., rear member or disc) and a second annular member 62b (e.g., forward member or disc), which surround (e.g., are concentric with) the primary output shaft 30. The first annular member 62a is fixed axially but is rotatable relative to the central axis 30a of the primary output shaft 30 (e.g., being translationally fixed to the transfer case housing 12 and rotatable relative thereto). More particularly, the first annular member 62a is configured to be rotated by the reduction gear assembly 64 and, for example, includes teeth (not shown) on an outer periphery thereof or on another member (e.g., gear member) coupled thereto, which may form a sector gear. The second annular member 62b is fixed rotatably about the central axis 30a of the primary output shaft 30 but is axially movably between a first position (shown in FIG. 4A) and a second position (shown in FIG. 4B).

As the first annular member 62a of the face cam mechanism 62 is rotated relative to the second annular member 62b about the central axis 30a, the first annular member 62a forces the second annular member 62b forward into the second position to press the apply plate 52c forward and to compress the interleaved plates 52b. As referenced above, the face cam mechanism 62 may be configured as a ball-ramp mechanism that includes rolling members 62c (e.g., balls) that are arranged between axial faces of the first annular member 62a and the second annular member 62b, which face each other. The axial faces include ramped surfaces (not shown; sloping or helically shaped channels or recesses) that shallow in depth relative to the axial faces and in which the rolling members 62c are arranged. As the first annular member 62a is rotated relative to the second annular member 62b, the cumulative depth of the ramped surfaces lessens between opposed locations of the first annular member 62a and the second annular member 62b, such that the rolling members 62c press the second annular member 62b away from the first annular member 62a. Other variations of the face cam mechanism 62, which convert rotational movement of one member into axial displacement of another member, may instead be used.

Referring additionally to FIGS. 5A-5D, the reduction gear assembly 64 includes one or more planetary gear sets (e.g., a first planetary gear set 66 and a secondary planetary gear set 66'), which function to reduce output speed and increase torque from the actuator motor 20 to the face cam mechanism 62 (i.e., to the first annular member 62a). The various gears of the reduction gear assembly 64 are depicted schematically but include teeth of suitable geometry for engaging each other and transferring torque therebetween. Each of the planetary gear sets receives an input torque (e.g., a first, second, third, etc. input torque), an output torque of the actuator motor 20 (e.g., motor output torque), or an output torque of a prior one of the planetary gear sets (e.g., a first, second, third, etc. output torque); increases such input torque by a ratio (e.g., a reduction ratio); and outputs an output torque (i.e., the first, second, third, etc. output torque).

The first planetary gear set 66 includes a plurality of planet gears 66a, a planet carrier 66b, and a ring gear 66c. The planet gears 66a (e.g., four as shown) orbit and are engaged with a output gear 20a of the motor 20 (or other output from the motor 20), which functions as a sun gear to the planetary gear set 66, and are engaged with the ring gear 66c. The ring gear 66c is rotationally fixed to the transfer case housing 12. The actuator motor 20 thereby provides the motor output torque, which is received by the first planetary gear set as a first input torque.

The planet carrier 66b is coupled to the planet gears 66a with pinion shafts 66d. The planet carrier 66b also functions as an output of the first planetary gear set 66 and as an input (e.g., sun gear) to the second planetary gear set 66'. The planet carrier 66b, thereby, includes or is coupled to an output gear 66e (or sun gear or output gear portion) that functions as a sun gear to the second planetary gear set 66'. The planet carrier 66b rotates at the same rate of rotation as the rate at which the planet gears 66a orbit a central axis 20b of the actuator motor 20 (i.e., of the output gear 20a). The first planetary gear set 66 thereby increases the first input torque by a first ratio to provide a first output torque. While the planet carrier 66b is depicted as a unitary structure both rotatably coupled to the planet gears 66a and forming the output gear 66e, the planet carrier 66b may instead be formed of multiple components (e.g., separate components coupled to the planet gears 66a and another component forming the output gear 66e).

The first planetary gear set 66 may, for example, reduce the rate of rotation and increase torque from the output gear 20a (i.e., the output of the actuator motor 20) by a first ratio (e.g., first reduction ratio) of between approximately 2:1 and 8:1 (e.g., 4:1). The reduction ratio may be derived from the relative number of teeth and/or relative diameters of the output gear 20a, the planet gears 66a, and the ring gear 66c. For example, the planet gears 66a and the output gear 20a may have the same number of teeth (not shown or labeled), which results in a 4:1 reduction ratio using standard equations for planetary gear set ratios. More particularly, $R=(2\times P)+S$, where R equals the number of teeth of the ring gear 66c, P equals the number of teeth of the planet gears 66a, and S equals the number of teeth of the output gear 20a. Additionally, $(R+S)\times Tc=(R\times TR)+(Ts\times S)$, wherein Tc equals the number of turns of the planet carrier 66b, TR equals the number of turns of the ring gear 66c, and Ts equals the number of turns of the output gear 20a.

The second planetary gear set 66' may be configured similar to the first planetary gear set 66 and include a plurality of planet gears 66a', a planet carrier 66b', and a ring gear 66c'. The planet gears 66a' orbit and are engaged with the planet carrier 66b of the first planetary gear set 66 (or other input), and are engaged with the ring gear 66c'. The planet carrier 66b of the first planetary gear set 66 thereby provides the first output torque (e.g., via the output gear 66e), which is received by the second planetary gear set 66' as a second input torque. The ring gear 66c' is rotationally fixed to the transfer case housing 12. The ring gear 66c and the ring gear 66c' may be formed as a continuous member (as shown), be formed by spaced apart portions of a singular member, or may be formed by separate members.

The planet carrier 66b' is coupled to and supports (and/or is supported by) the planet gears 66a' with pinion shafts 66d'. The planet carrier 66b' also functions as an output of the planet carrier 66b' and as an input, direct or indirect, to the face cam mechanism 62 (i.e., to rotate the first annular member 62a). The planet carrier 66b', thereby, includes or is coupled to an output gear 66e' (e.g., sun gear or output gear portion). The planet carrier 66b' rotates at the same rate of rotation at which the planet gears 66a' orbit the central axis 20b of the actuator motor 20. The second planetary gear set 66' thereby increases the second input torque by a second ratio and provides a second output torque. The second planetary gear set 66' may, for example, reduce the rate of rotation and increase torque from the planet carrier 66b' of the first planetary gear set 66 by a ratio (e.g., second reduction ratio) of between approximately 2:1 and 8:1 (e.g., 4:1). As a result, the first planetary gear set 66 and the second planetary gear set 66' may cooperatively reduce the rate of rotation and increase torque from the output of the actuator motor 20 by a ratio (e.g., planetary reduction ratio) of between approximately 4:1 and 64:1 (e.g., 16:1).

The reduction gear assembly 64 may be provided as a subassembly, which is installed as a unit into to the transfer case housing 12 of the transfer case 10. The reduction gear assembly 64 includes a housing 64a. The housing 64a may, for example, be substantially cylindrical with an annular portion 64b that extends between a first axial face 64c (e.g., first or rear end) and a second axial face 64d (e.g., second or forward end). The annular portion 64b may form, or have coupled thereto, the ring gear 66c of the first planetary gear set 66 and the ring gear 66c' of the second planetary gear set 66'. The first axial face 64c includes an aperture (not labeled) that is configured to receive an input (e.g., the output gear 20a of the actuator motor 20). Alternatively, an input receiver (e.g., for receiving an output of the actuator motor 20, such as the output gear 20a) may protrude through the aperture of the first axial face 64c for receipt of such output outside of the housing 64a. The second axial face 64d includes another aperture (not labeled) through which an output (e.g., the sun gear formed by the planet carrier 66b') protrudes. The first axial face 64c or the second axial face 64d may be formed integrally with the annular portion 64b, or may be separately formed structures (e.g., members) that are coupled to the annular portion 64b to enclose the first planetary gear set 66 and the second planetary gear set 66' therein. Furthermore, the apertures of the first axial face 64c and/or the second axial face 64d may be sealed, for example, for an appropriate amount and type of lubricant to be retained within the reduction gear assembly 64 for an expected useful life.

By providing the reduction gear assembly 64 as a unit that is subsequently installed in the transfer case housing 12 of the transfer case 10, assembly and performance of the reduction gear assembly 64 may be improved as compared to being assembled in the transfer case housing 12 (e.g., installing several gears individually into the transfer case housing 12). The reduction gear assembly 64 may be assembled in an environment separate from that for assembling the transfer case 10, which may be specifically suited therefor, for example, including more precise tooling and/or fixtures. As a result, the reduction gear assembly 64 may be assembled more predictably and within tighter tolerances, which may achieve higher performance (e.g., less internal friction and/or greater reliability).

The actuator system 60 may additionally include an intermediate gear 68, which may function as an intermediate rotating member that is rotated by the reduction gear assembly 64 and, thereby, rotates the first annular member for selective operation of the torque transfer mechanism 50 or the face cam mechanism 62 (e.g., the first annular member 62a).

The intermediate gear 68 engages the output of the reduction gear assembly 64 (e.g., the output gear 66e' of the second planetary gear set 66') and the first annular member 62a of the face cam mechanism 62 to transfer torque therebetween. The planet carrier 66b' of the second planetary gear set 66' thereby provides the second output torque, which is received by the intermediate gear 68 as a third input torque.

The intermediate gear 68 provides a radial offset between the face cam mechanism 62 and the output of the reduction gear assembly 64 (e.g., the output gear 66e' of the second planetary gear set 66'), which may provide flexibility in dimensions and orientation of various components. For example, use of the intermediate gear 68 allows for a difference between radii of the actuator motor 20 and the output gear 66e' (i.e., the output of the second planetary gear set 66') to be greater than a difference between the radii of the primary output shaft 30 and the first annular member 62a of the face cam mechanism 62. By having the intermediate gear 68 arranged between the face cam mechanism 62 and the reduction gear assembly 64, the actuator motor 20 may be considered to have a dual axis parallel offset relative to the primary output shaft 30 (i.e., an axis 68a of the intermediate gear 68 is considered a first parallel offset axis to the primary output shaft 30, while the central axis 20b of the actuator motor 20 is considered a second parallel offset axis to the intermediate gear 68).

The intermediate gear 68 may also function with the output of the reduction gear assembly 64 (e.g., the output gear 66e' of the reduction gear assembly 64) to further decrease the output speed and increase the output torque of the actuator motor 20. The intermediate gear 68 thereby increases the third input torque by a third ratio to produce a third output torque, for example, by a ratio (e.g., additional reduction ratio) of between 4:1 and 12:1 (e.g., between 6:1 and 10:1 such as 6.875:1). As a result, the actuation system 60 may achieve a reduction ratio (e.g., total or cooperative gear reduction ratio) of between 24:1 and 300:1, such as between 80:1 and 150:1 (e.g., 110:1) between the actuator motor 20 and the face cam mechanism 62.

The intermediate gear 68 and the first annular member 62a may provide no further ratio change (e.g., having the same number of teeth and/or diameter), or may further reduce the speed and increase the output torque of the actuator motor 20, or vice versa.

Variations of the transfer case 10 and the actuation system 60 are contemplated, which may include one or more of a chain-operated torque transfer mechanism, an actuation system having functions in addition to actuating the torque transfer mechanism, a reduction gear assembly having one or more additional planetary gear sets, and/or a reduction gear assembly (and/or motor) having a single parallel offset from the face cam mechanism and the primary output shaft. All of these variations are embodied in a transfer case 110 (discussed below), but it should be understood that any of these variations may be used alone or in any suitable combination with any one or more of the other aforementioned variations.

Figure 6A:
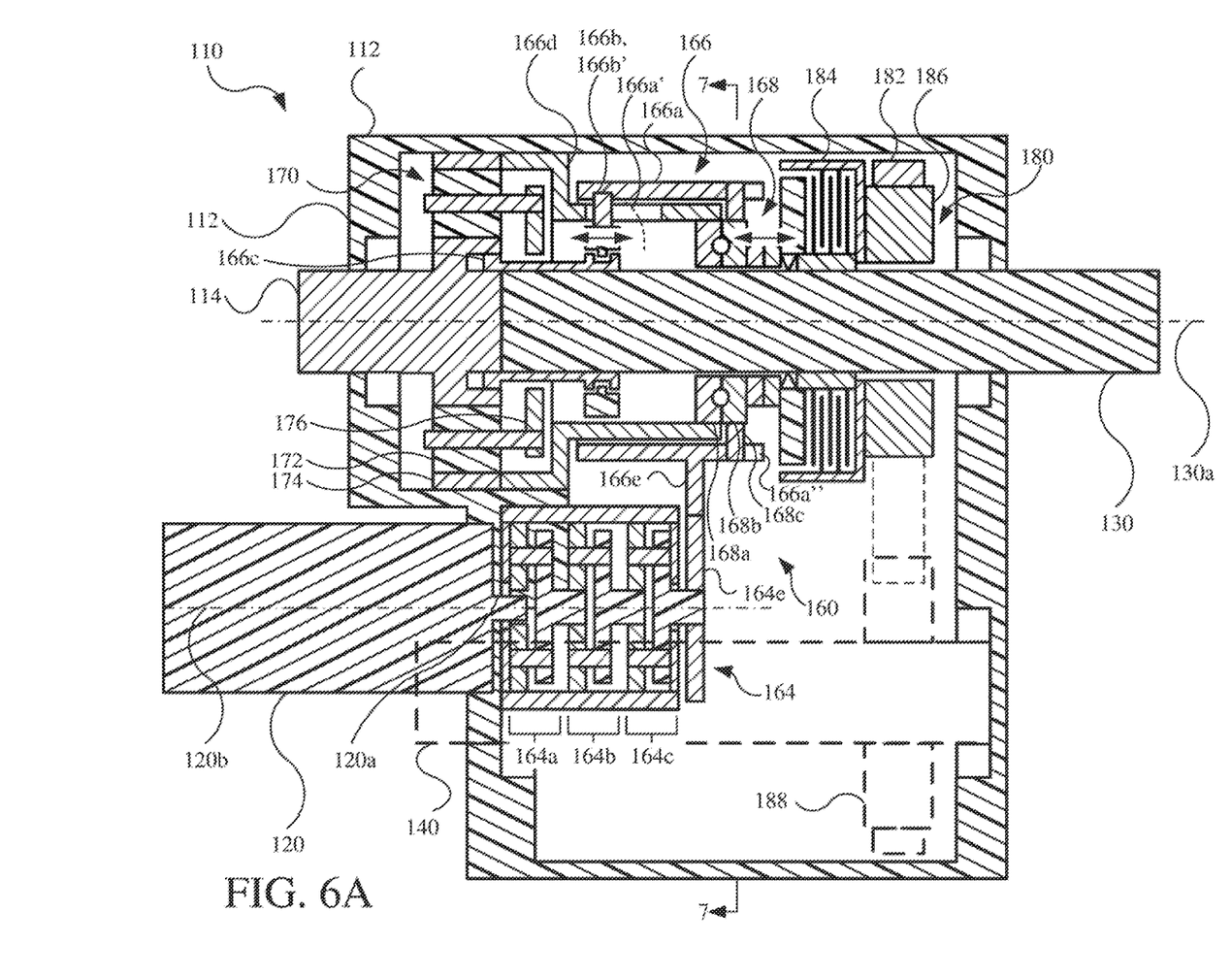
FIG. 6A is a schematic cross-sectional view of another embodiment of a transfer case for use with the powertrain of the vehicle of FIG. 1, the transfer case being in a first state.
Figure 6B:
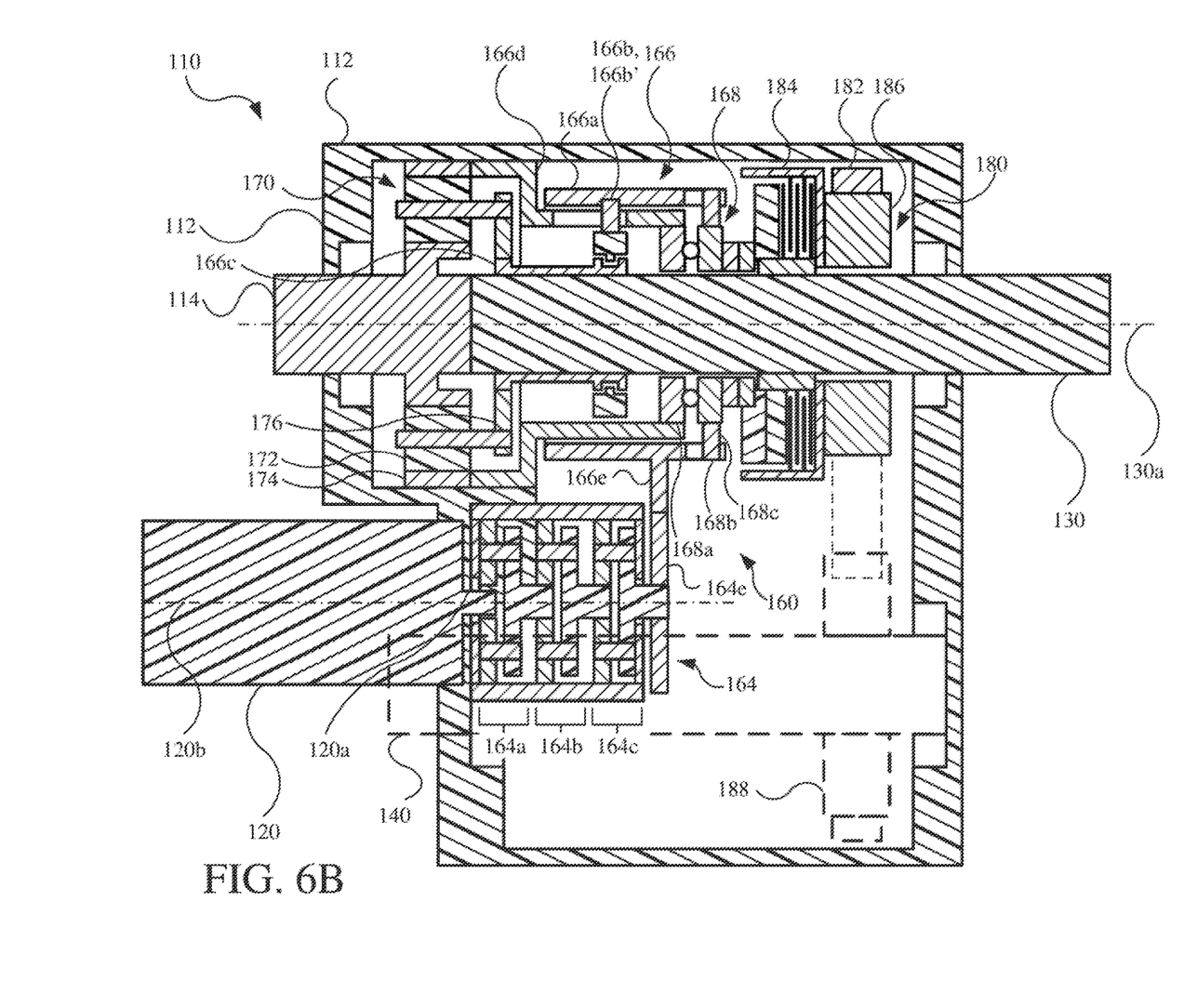
FIG. 6B is a schematic cross-sectional view of the transfer case of FIG. 6A in a second state.
Figure 7:
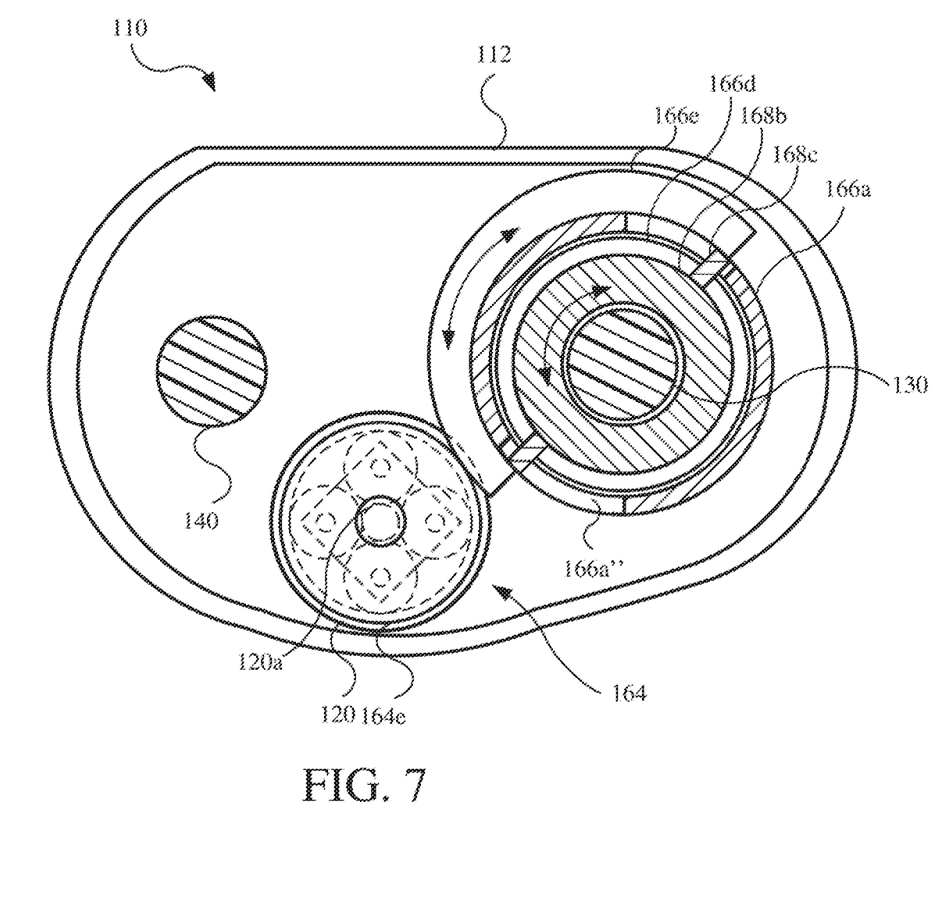
FIG. 7 is a schematic cross-sectional view taken along line 7-7 in FIG. 6A.

Referring to FIGS. 6A-7, the transfer case 110 generally includes a transfer case housing 112, an actuator motor 120, a primary output shaft 130, and a secondary output shaft 140. The transfer case 110 may include a drive gear reduction mechanism 170 of the transfer case 110, which transfers torque from an input shaft 114 to the primary output shaft 130 selectively in high and low drive ratios. The secondary output shaft 140 is selectively rotatably coupled to the primary output shaft 130 with a torque transfer mechanism 180 of the transfer case 110. Each of the drive gear reduction mechanism 170 and the torque transfer mechanism 180 may be operated (e.g., activated) by an actuation system 160 of the transfer case 110 by selective control of the actuator motor 120.

The drive gear reduction mechanism 170 is configured as a planetary gear set. The input shaft 114 functions as a sun gear that engages planet gears 172 supported by pinion shafts (not labeled), which in turn engage a fixed ring gear 174. The planet gears 172 are coupled to a planet carrier 176 with the pinion shafts (not labeled). The actuation system 160 includes a locking sleeve 166c (e.g., shift sleeve or dog clutch) that is rotatably fixed to the primary output shaft 130 (e.g., via a sliding splined connection) and is selectively rotatably coupleable to one of the input shaft 114 (i.e., for a 1:1 drive ratio; e.g., in a forward position shown in FIG. 6A) or to the planet carrier 176 (i.e., for increased output torque; e.g., in a rearward position shown in FIG. 6B) at a given time. Movement of the locking sleeve 166c is discussed in further detail below in conjunction with the actuation system 160.

The torque transfer mechanism 180 transfers torque between the primary output shaft 130 and the secondary output shaft 140 with a chain 182. The torque transfer mechanism 180 generally includes a plate clutch 184 (configured similar to the plate clutch 52), a primary sprocket 186, a secondary sprocket 188, and the chain 182. The plate clutch 184 selectively couples the primary sprocket 186 to the primary output shaft 130 (i.e., with the primary sprocket 186 being rotatably fixed to a housing or drum of the plate clutch 184). The secondary sprocket 188 is rotatably fixed to the secondary output shaft 140 (e.g., via a splined connection). The chain 182 extends between the primary sprocket 186 and the secondary sprocket 188, so as to selectively transfer torque between the primary output shaft 130 and the secondary output shaft 140 when the plate clutch 184 is engaged (e.g., compressed, as shown in FIG. 6B).

The actuation system 160 includes the actuator motor 120, an actuation reduction gear assembly 164, a barrel cam mechanism 166, and a face cam mechanism 168.

The barrel cam mechanism 166 is configured to operate the drive gear reduction mechanism 170. The barrel cam mechanism 166 generally includes a barrel 166a (e.g., barrel cam), a fork 166b (e.g., shift fork), and the locking sleeve 166c. The barrel 166a is concentric with the primary output shaft 130. The barrel 166a is rotatably supported on its inner periphery by a support member 166d that is fixedly coupled to the transfer case housing 112.

An outer end 166b' of the fork 166b is received in a cam slot 166a' (e.g., groove; depicted schematically in broken lines) in a cylindrical inner periphery of the barrel 166a, while an inner end (not labeled) of the fork 166b is coupled to the locking sleeve 166c (e.g., being received in an outer groove thereof). The outer end 166b' of the fork 166b additionally slides within an axially extending slot (not labeled) of the support member 166d, which allows the fork 166b to slide axially, while maintaining the fork 166b in a constant rotational position.

As the barrel 166a is rotated by the actuator motor 120 (as discussed in further detail below), the outer end 166b' of the fork 166b is pushed and pulled axially by the cam slot of the barrel 166a to, thereby, move the locking sleeve 166c between the forward position and the rearward position. In the forward position, the locking sleeve 166c rotatably couples the input shaft 114 directly to the primary output shaft 130 with a 1:1 drive ratio. In the rearward position (shown in FIG. 6B), the locking sleeve 166c rotatably couples the input shaft 114 and the primary output shaft 130 are rotatably coupled to each other with the drive gear reduction mechanism 170 with a different drive ratio.

The face cam mechanism 168 (e.g., ball-ramp mechanism) is configured in manners similar to the face cam mechanism 62 for converting rotational motion into axial motion for compressing the plate clutch 184 and being concentric with the primary output shaft 130 and a central axis 130a thereof.

The face cam mechanism 168 generally includes a first annular member 168a (e.g., forward member, disc, or structure) that is rotationally and axially fixed to the support member 166d. The face cam mechanism 168 additionally includes a second annular member 168b (e.g., rearward member, disc, or struction) that is both rotatably and axially displaceable relative to the first annular member 168a. In particular, the second annular member 168b includes radial members 168c (e.g., rollers) that protrude radially therefrom and which are received in circumferential slots 166a" of the barrel 166a. The circumferential slots 166a" allow the barrel 166a to rotate independent of the second annular member 168b during operation of the drive gear reduction mechanism 170, and also engage the radial members 168c to rotate the second annular member 168b that in turn move (e.g., roll) axially rearward along the ends of the circumferential slots 166a" to compress the plate clutch 184. The drive gear reduction mechanism 170 may, for example, be operated in a middle range of motion of the barrel 166a to change between the high and low drive ratios (e.g., in a range of 30-60 degrees, which corresponds to a curved region of the cam slot 166a'), while the torque transfer mechanism 180 may be operated in one or more outer ranges of motion of the barrel 166a to compress the plate clutch 184 (e.g., another 30-60 degrees at the ends of the first range of motion, which correspond to straight regions of the cam slot 166a'). The plate clutch 184 may include a spring (not labeled), which causes the apply plate to disengage the interleaved plates as the face cam mechanism 168 is rotated for disengagement from the plate clutch 184.

The barrel 166a is configured to be rotated by the actuator motor 120. The barrel 166a may be considered an intermediate rotating member that is rotated by the actuation reduction gear assembly 164 for selective operation of the torque transfer mechanism 180 or the face cam mechanism (e.g., the second annular member 168b).

More particularly, the actuation reduction gear assembly 164 receives input torque from the actuator motor 120, reduces the output speed and increases the output torque, and transfers such torque to the barrel 166a. The actuation reduction gear assembly 164 is configured similar to the reduction gear assembly 64 by including multiple planetary gear sets 164a, 164b, 164c (i.e., three or more planetary gear sets), which function to reduce speed and increase torque output from the actuator motor 20 in the manners described above. That is, each of the planetary gear sets 164a, 164b, 164c receives an output torque from the actuator motor 120 or another of the planetary gear sets 164a, 164b as an input torque, and increases the input torque by a ratio (e.g., reduction ratio) to produce an output torque. The planetary gear sets 164a, 164b, 164c may each have a reduction ratio (e.g., individual reduction ratio) of between 2:1 and 8:1 (e.g., 4:1) and a combined reduction of between 8:1 and 496:1 (e.g., 64:1). Each of the planetary gear sets includes a sun gear (not labeled), planet gears (not labeled), a planet carrier (not labeled), and a ring gear (not labeled) as discussed above (refer to discussion of the planetary gear sets 66, 66' above).

The sun gear of the planetary gear sets may be a motor output gear 120a of the actuator motor 120 or an output of one of the other planetary gear sets (e.g., the carrier) with the input of the first planetary gear set 164a being the motor output gear 120a of the actuator motor 120 and the output of the last planetary gear set 164c being an input to the barrel 166a.

More particularly, the barrel 166a includes a barrel gear 166e (e.g., sector gear), which is formed integrally therewith or is coupled thereto and is coaxial therewith. The barrel gear 166e is engaged and rotated by an output gear 164e of the actuation reduction gear assembly 164, which is coupled to the carrier of the last planetary gear set 164c and rotates coaxially therewith. The barrel gear 166e of the barrel 166a and the output gear 164e of the actuation reduction gear assembly 164 may further reduce the speed and increase torque output from the actuator motor 120 with a reduction ratio (e.g., barrel reduction ratio) of between 2:1 and 8:1 (e.g., 2:1). Alternatively, the barrel reduction ratio may be 1:1 (e.g., to achieve no reduction), or be less than 1:1 (e.g., to achieve greater speed and reduced torque output from the actuator motor 120). A total reduction ratio (i.e., the cumulative reduction ratio and the barrel reduction ratio) may, for example, be between 50:1 and 400:1 (e.g., 128:1).

Direct engagement between the output gear 164e of the actuation reduction gear assembly 164 and the barrel gear 166e provides a radial offset between the face cam mechanism 168. This may be considered a single parallel offset between a central axis 120b of the actuator motor 120 (and the actuator reduction gear assembly 164) and the central axis 130a of the primary output shaft 130 (and the barrel cam mechanism 166 and/or the face cam mechanism 168), since the output gear 164e of the actuation reduction gear assembly 164 (which is coaxial with the actuator motor 120) directly engages the barrel gear 166e of the barrel 166a (which is coaxial with the primary output shaft 130 and the face cam mechanism 168). This single parallel offset between the actuator motor 120 and the face cam mechanism 168, the primary output shaft 130, and/or the barrel 166a may, for example, allow the actuator motor 120 to be mounted in close proximity to the primary output shaft 130 and/or the secondary output shaft 140, which may provide tighter packaging and be advantageous for applications in vehicles having relatively low ground clearance (e.g., as compared to instead using a gear train to provide gear reduction from the motor, as may be permissible in vehicles having high ground clearance).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law. As used herein, the term "mechanical cooperation" may refer to components or systems that cooperate in in some mechanical manner, for example, such that action of one component or system (e.g., motion thereof) may cause another action of another component or system (e.g., motion thereof) that is in mechanical cooperation therewith. The term "mechanical cooperation" includes both indirect cooperation between components or system (e.g., with one or more intermediate components or systems acting therebetween) and may include direct cooperation or engagement (e.g., without any intermediate component acting therebetween). The term "mechanical engagement" may refer to components or systems that directly engage (e.g., contact) each other, such as one gear engaging another gear (e.g., to cause motion thereof). The term "mechanical cooperation" may include the term "mechanical engagement."

The invention claimed is:

1. An actuation system for a torque transfer device of a vehicle powertrain, the actuation system comprising:
    a transfer housing;
    a face cam mechanism having first and second annular members, wherein relative rotation between the first and second annular members causes axial displacement of one of the first or second annular members to activate a torque transfer mechanism of the torque transfer device;
    an actuator motor in mechanical cooperation with the face cam mechanism;
    a gear reduction assembly in mechanical cooperation with the actuator motor, the gear reduction assembly comprising:
        a gear reduction housing including a first axial face;
        a first planetary gear set that receives and increases torque from the actuator motor by a first ratio to provide a first output torque, the first planetary gear set being positioned in coaxial relation with the actuator motor; and
        a second planetary gear set that receives and increases the first output torque by a second ratio to provide a second output torque, the second planetary gear set being positioned in coaxial relation with the first planetary gear set and the actuator motor; and
    wherein the gear reduction housing is disposed within an interior of the transfer housing such that the first axial face of the gear reduction housing contacts an interior axial face of the transfer housing; and
    at least one intermediate member rotated by the gear reduction assembly to cause relative rotation between the first and second annular members to thereby activate the torque transfer mechanism.

2. The actuation system according to claim 1, wherein the first planetary gear set comprises:
    a plurality of first planet gears that receive torque from the actuator motor;
    a first planet carrier in mechanical cooperation with the second planetary gear set; and
    a first ring gear that circumscribes the first planet gears.

3. The actuation system according to claim 2, wherein the second planetary gear set comprises:
    a plurality of second planet gears in mechanical cooperation with the first planet carrier;
    a second planet carrier in mechanical cooperation with the at least one intermediate member; and
    a second ring gear that circumscribes the second planet gears.

4. The actuation system according to claim 1, wherein the at least one intermediate member includes a barrel cam positioned in coaxial relation with the face cam mechanism.

5. The actuation system according to claim 4, wherein the at least one intermediate member engages the second planetary gear set to receive and increase the second output torque by a third ratio to provide a third output torque, the at least one intermediate member engaging at least one of the first or second annular members to cause relative rotation between the first and second annular members.

6. The actuation system according to claim 4, wherein the gear reduction assembly further includes a third planetary gear set that receives and increases the second output torque by a third ratio to provide a third output torque, the barrel cam engaging the third planetary gear set to receive the third output torque and cause relative rotation between the first and second annular members.

7. The actuation system according to claim 4, wherein the face cam mechanism includes a plurality of rolling members positioned between the first and second annular members.

8. The actuation system according to claim 7, wherein the first and second annular members include opposed axial faces having ramped surfaces between which are the plurality of rolling members.

9. The actuation system according to claim 4, wherein the barrel cam rotates the first annular member.

10. A torque transfer device configured and dimensioned to transfer torque from a primary output shaft of a vehicle powertrain to a secondary output shaft of the vehicle powertrain, the torque transfer device comprising:
    a housing;
    a torque transfer mechanism positioned within the housing and including a primary gear, a plate clutch rotatably coupling the primary gear to the primary output shaft of the vehicle powertrain, a secondary gear rotatably fixed to the secondary output shaft of the vehicle powertrain, and one of a chain or a transfer gear that extends between the primary gear and the secondary gear to transfer torque therebetween; and
    an actuation system comprising:
        an actuator motor including an output gear;
        a ball-ramp mechanism in mechanical cooperation with the actuator motor and including first and second annular members, wherein relative rotation between the first and second annular members causes relative axial displacement between the first and second annular members to actuate the torque transfer mechanism; and
        a gear reduction assembly comprising a first planetary gear set that receives and increases torque from the actuator motor by a first ratio to provide a first output torque; and a second planetary gear set that receives and increases the first output torque from the first planetary gear set by a second ratio to provide a second output torque; and at least one intermediate member having a gear and a barrel cam, the gear and the barrel cam are one-piece, monolithically formed, the at least one intermediate member is in mechanical engagement with the gear reduction assembly and the face cam mechanism for rotational movement such that rotation of the at least one intermediate member causes relative rotation between the first and second annular members of the face cam mechanism to actuate the torque transfer mechanism.

11. The torque transfer device of claim 10, wherein the first planetary gear set comprises:
    a plurality of first planet gears in mechanical engagement with the output gear of the actuator motor;

a first planet carrier in mechanical engagement with the second planetary gear set; and a first ring gear rotationally fixed to the housing.

12. The torque transfer device of claim 11, wherein the second planetary gear set comprises:

a plurality of second planet gears in mechanical engagement with the first planet gears;

a second planet carrier in mechanical engagement with the at least one intermediate member to cause rotation of the at least one intermediate member; and a second ring gear rotationally fixed to the housing.

13. The torque transfer device of claim 12, wherein the first planetary gear set is configured and dimensioned such that the first ratio lies within the range of 2:1 to 8:1.

14. The torque transfer device of claim 13, wherein the second planetary gear set is configured and dimensioned such that the second ratio lies within the range of 2:1 to 8:1, whereby the first planetary gear set and the second planetary gear set collectively increase torque from the actuator motor by a ratio within the range of 4:1 to 64:1.

15. The actuation system according to claim 12, wherein the gear reduction assembly further includes a third planetary gear set that receives and increases the second output torque by a third ratio to provide a third output torque.

16. The actuation system of claim 15, wherein the at least one intermediate member mechanically engages the third planetary gear set to receive the third output torque and cause relative rotation between the first and second annular members.

17. The actuation system according to claim 10, wherein the ball-ramp mechanism includes a plurality of rolling members positioned between the first and second annular members.

18. The actuation system according to claim 17, wherein the first and second annular members include opposed axial faces having ramped surfaces between which the rolling members are positioned.

19. The actuation system according to claim 10, wherein the barrel cam rotates the first annular member.

20. A torque transfer device configured and dimensioned to transfer torque from a primary output shaft of a vehicle powertrain to a secondary output shaft of the vehicle powertrain, the torque transfer device comprising:

a torque transfer mechanism; and an actuation system engageable with the torque transfer mechanism, the actuation system comprising:

an actuator motor;

a face cam mechanism in mechanical cooperation with the actuator motor, the face cam mechanism including first and second annular members configured and dimensioned for relative rotation to cause relative axial displacement between the first and second annular members and actuation of the torque transfer mechanism;

a gear reduction assembly comprising:

a first planetary gear set that receives and increases torque from the actuator motor by a first ratio to provide a first output torque;

a second planetary gear set that receives and increases the first output torque from the first planetary gear set by a second ratio to provide a second output torque; and a third planetary gear set that receives and increases the second output torque by a third ratio to provide a third output torque; and at least one intermediate member having a gear and a barrel cam, the gear and the barrel cam are one-piece, monolithically formed, the at least one intermediate member is in mechanical engagement with the gear reduction assembly and the face cam mechanism for rotation thereof such that torque transferred to the at least one intermediate member causes relative rotation between the first and second annular members.

* * * * *

UNITED STATES PATENT AND TRADEMARK OFFICE
CERTIFICATE OF CORRECTION

PATENT NO. : 10,994,609 B2
APPLICATION NO. : 15/960731
DATED : May 4, 2021
INVENTOR(S) : Mallikarjun Rudagi, Abhinav Jain and Sathya Vaidyanathan Page 1 of 1

It is certified that error appears in the above-identified patent and that said Letters Patent is hereby corrected as shown below:

In the Specification

Column 7, Line 54, change "(R × TR)" to -- (R × $T_R$) --; and

Column 7, Line 55, change "TR" to -- $T_R$ --.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*